(12) United States Patent
Orlando

(10) Patent No.: US 8,317,519 B1
(45) Date of Patent: Nov. 27, 2012

(54) RESUSCITATION METRONOME

(75) Inventor: Michael P. Orlando, Peshtigo, WI (US)

(73) Assignee: Rapid Response Solutions, LLC, Athelstane, WI (US)

( * ) Notice: Subject to any disclaimer, the term of this patent is extended or adjusted under 35 U.S.C. 154(b) by 502 days.

(21) Appl. No.: 12/437,835

(22) Filed: May 8, 2009

Related U.S. Application Data

(60) Provisional application No. 61/051,726, filed on May 9, 2008.

(51) Int. Cl.
*G09B 23/28* (2006.01)

(52) U.S. Cl. .................................. 434/262; 434/265

(58) Field of Classification Search ............... 434/262, 434/265
See application file for complete search history.

(56) References Cited

U.S. PATENT DOCUMENTS

| | | | | |
|---|---|---|---|---|
| 4,095,590 A | * | 6/1978 | Harrigan | 601/1 |
| 4,491,423 A | * | 1/1985 | Cohen | 368/107 |
| 4,583,524 A | * | 4/1986 | Hutchins | 128/898 |
| 4,736,322 A | * | 4/1988 | Clifford | 703/11 |
| 4,797,104 A | * | 1/1989 | Laerdal et al. | 434/265 |
| 4,863,385 A | * | 9/1989 | Pierce | 434/265 |
| 4,971,059 A | | 11/1990 | Niewald | |
| 5,088,037 A | * | 2/1992 | Battaglia | 600/300 |
| 5,394,892 A | * | 3/1995 | Kenny et al. | 128/897 |
| 5,496,257 A | | 3/1996 | Kelly | |
| D411,620 S | | 6/1999 | Lindseth | |
| 5,913,685 A | * | 6/1999 | Hutchins | 434/265 |
| 5,944,018 A | | 8/1999 | Allgood | |
| D466,215 S | | 11/2002 | Lindseth | |
| 6,626,843 B2 | | 9/2003 | Hillsman | |
| 7,074,199 B2 | | 7/2006 | Halperin | |
| 7,108,665 B2 | | 9/2006 | Halperin | |
| 7,567,180 B2 | * | 7/2009 | Blevins et al. | 340/573.1 |
| 2002/0078966 A1 | | 6/2002 | Lewis | |
| 2006/0173501 A1 | * | 8/2006 | Stickney et al. | 607/5 |
| 2006/0270952 A1 | * | 11/2006 | Freeman et al. | 601/41 |
| 2007/0135739 A1 | | 6/2007 | Halperin | |
| 2007/0232365 A1 | * | 10/2007 | Kogan | 455/573 |
| 2008/0145827 A1 | * | 6/2008 | Strand et al. | 434/265 |

OTHER PUBLICATIONS

Ewyr, G. "Cardiocerebral Resuscitation : The New Cardiopulmonary Resuscitation." Circulation Journal of American Heart Association. 2005.*
Hands-Only CPR; American Heart Association; http://handsonlycpr.org; Feb. 24, 2011; 1 page.
LyfeTymer ACM—LED Metronome; http://www.lyfetymer.com; at least as early as Aug. 4, 2009; 2 pages.
CPR Ezy—Effective CPR When it's a Matter of Life; http://www.cprezy.com; at least as early as Aug. 4, 2009; 1 page.
Zoll PocketCPR—Your CPR Coach; http://www.pocketcpr.com; at least as early as Aug. 14, 2009; 1 page.
SafetyMate—Talking First Aid; http://www.safetymate.com; at least as early as Aug. 4, 2009; 2 pages.

(Continued)

*Primary Examiner* — Robert J Utama
(74) *Attorney, Agent, or Firm* — Whyte Hirschboeck Dudek S.C.

(57) ABSTRACT

A portable metronome is provided for assisting medical resuscitations, including cardiopulmonary and cardiocerebral resuscitations. The metronome includes a user interface having a plurality of criteria selection buttons, which when selected, can alter the resuscitation sequence to be generated. Resuscitation sequence prompts can include both audible and visual prompts. The sequence generation is at least in part based upon medically accepted resuscitation guidelines.

20 Claims, 6 Drawing Sheets

OTHER PUBLICATIONS

What is LyfeTymer ACM? LyfeTymer ACM Presentation; www.lyfetymer.com; Jul. 2007; 7 pages.
CPR Counts on LyfeTymer—Product Flyer; www.lyfetymer.com; Jul. 2007; 2 pages.
Rhythm of Life—Predicate Device Comparison Checklist; Oct. 2008; 4 pages.
510(K) Summary—Rhythm of Life by Rapid Response Solutions, LLC; Jul. 29, 2009; 6 pages.
Press Release—New Timing Tool Announced for CPR—Lyfetymer® ACM (Audible Compression Metronome); Aug. 16, 2007; 1 page.
Tyming Life—Lyfetymer™ Metronome Company; http://www.lyfetymer.com; Jun. 12, 2007; 1 page.
New Product Release—AudibleNisual CPR Timer; Lyfetymer® Metronome Company; http://www.lyfetymer.com; Dec. 18, 2007; 2 pages.
Pocket CPR—Real-Time CPR Feedback; http://www.pocketcpr.com; Oct. 6, 2008; 1 page.
CPR Ezy—When its a Matter of Life; http://www.cprezy.com; Mar. 27, 2002; 6 pages.
510(k) Premarket Notification; CPR Ezy Mask and Pad; Jun. 6, 2001; 6 pages.
510(k) Premarket Notification; PocketCPR; Sep. 12, 2007; 6 pages.
510(k) Premarket Notification; CPR Prompt; Oct. 11, 1995; 1 page.
510(k) Premarket Notification; Rhythm of Life, Model R0901-05; Oct. 14, 2009; 7 pages.

* cited by examiner

RESUSCITATION METRONOME

CLAIM OF PRIORITY

This application claims priority to U.S. Provisional Patent Application Ser. No. 61/051,726, titled Rhythm of Life Resuscitation Metronome, and filed on May 9, 2008, which is hereby incorporated by reference in its entirety herein.

FIELD OF THE INVENTION

The present invention relates to timing devices. More specifically, certain embodiments of the present invention relate to metronomes designed to assist rescuers in providing medical resuscitation.

BACKGROUND OF THE INVENTION

The most recent American Heart Association (AHA) Guidelines for cardiopulmonary resuscitation (CPR) place strong emphasis on the need for high quality chest compressions and a reduced number of ventilations. Currently, both professional and lay rescuers generally do not have an exact method for providing the specific rate of chest compressions or ventilations per minute. Resuscitation rates are generally estimated by the rescuer based on their CPR instruction. Inaccurate compression and ventilatory rates caused by miscalculation, distraction, and fatigue often negatively affects the quality of CPR provided.

It would be advantageous to provide an apparatus that would generate visual, audible or visual and audible alerts to prompt rescuers to provide the proper rate of chest compressions and/or ventilations to a patient. It would be a further advantage if the apparatus included the proper rates for adult, child, and infant patients as well as the appropriate chest compression to ventilatory ratio based on the patients' age and the number of rescuers involved.

SUMMARY OF THE INVENTION

In at least one embodiment, the present invention is an apparatus for generating cardiopulmonary or cardiocerebral resuscitation prompts. The apparatus includes a portable housing, a user interface having resuscitation criteria selectors and a processor configured to execute a set of instructions that generate cardiopulmonary or cardiocerebral resuscitation prompts, the instructions based at least in part upon resuscitation criteria selectors.

In another embodiment, the present invention is a method for generating resuscitation prompts including the steps of providing a timing apparatus configured to generate resuscitation prompts, the prompts based at least in part upon resuscitation criteria selectors, and selecting resuscitation criteria. Additional steps include, generating audio, visual or audio and visual ventilation prompts, generating audio, visual or audio and visual compression prompts and generating audio, visual or audio and visual patient assessment prompts.

Alternatively, at least one embodiment of the present invention includes an apparatus for generating a cardiopulmonary resuscitation prompt sequence. The apparatus includes a portable housing, a user interface having cardiopulmonary resuscitation criteria selectors, a user interface lockout means and a processor configured to execute a set of instructions that generate cardiopulmonary resuscitation prompts, the instructions based at least in part upon cardiopulmonary resuscitation criteria selectors, wherein audio and visual prompts are included within a prompt sequence.

DETAILED DESCRIPTION OF THE PREFERRED EMBODIMENT

Figure 1:
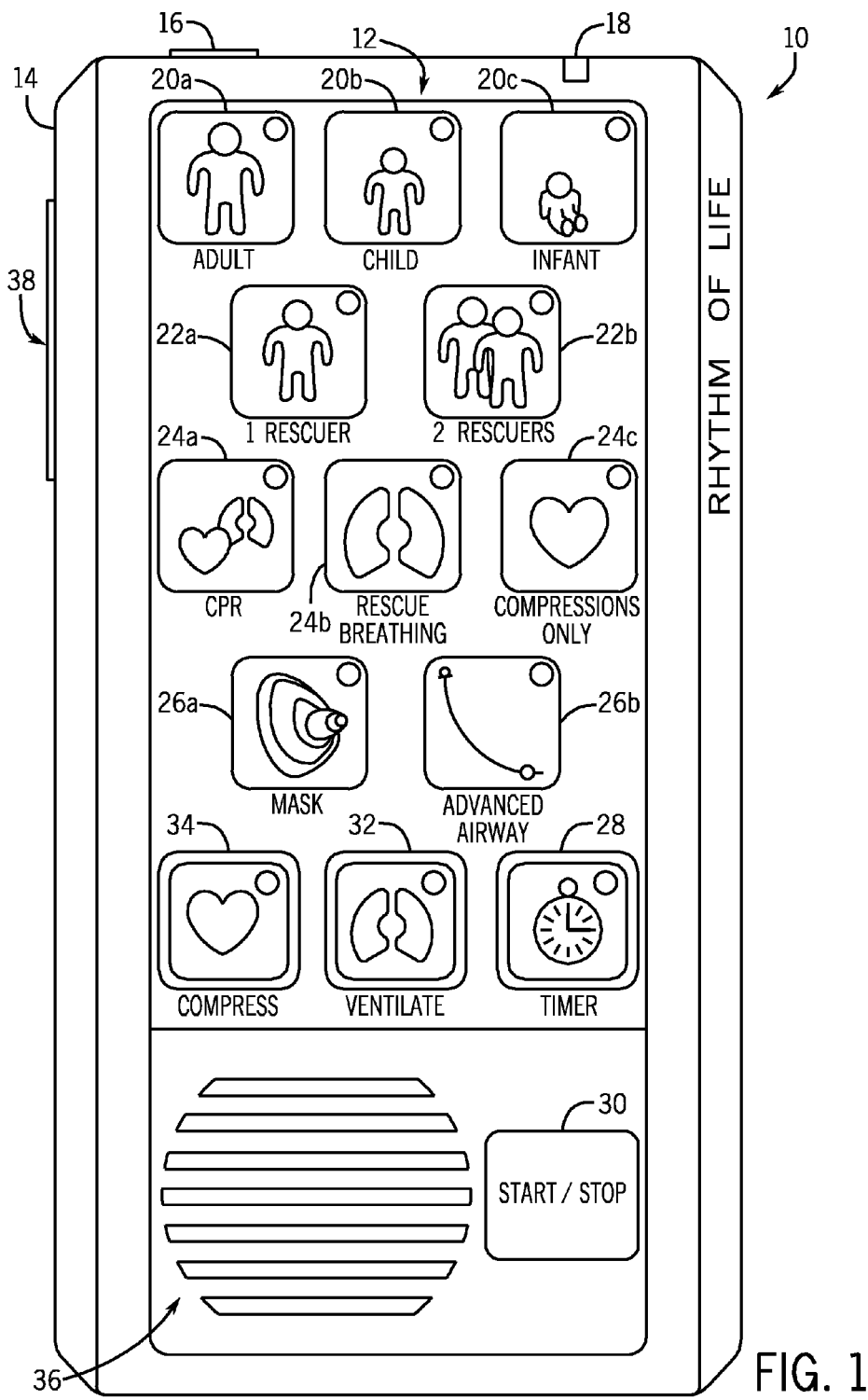
FIG. 1 is an exemplary metronome in accordance with at least one embodiment of the present invention.

Referring to FIG. 1, an exemplary metronome 10 apparatus is provided. The metronome 10 has a user interface (UI) 12 carried by a housing 14, a processor (See FIG. 6), and a power source (not shown). The processor has memory storage that includes executable instructions for performing various processes associated with prompting cardiopulmonary resuscitation (CPR). Exemplary embodiments utilize EEPROM or alternatively RAM memory. An exemplary UI 12 includes capacitance touch sensors as buttons.

The UI 12 includes a power button 16, a low battery indicator 18, a patient age group selection criteria button 20a, 20b, 20c, rescue operator number selection buttons 22a, 22b, resuscitation method selection buttons 24a, 24b, 24c, ventilation method selection buttons 26a, 26b, a timer indicator 28, a Start/Stop button 30, ventilation prompt indicator 32, chest compression prompt indicator 34, a speaker 36 and volume control mechanism 38. The group selection criteria button 20a, 20b, 20c, rescue operator number selection buttons 22a, 22b, resuscitation method selection buttons 24a, 24b, 24c, and ventilation method selection buttons 26a, 26b are exemplary resuscitation criteria selectors, which are used to generate a resuscitation prompt sequence. It is contemplated that other patient-specific or circumstance-specific criteria can be used to modify a resuscitation prompt sequence.

To initiate the metronome 10 press and hold the power button 16 until the UI 12 illuminates. The indicator 18 provides a means for identifying both when the device 10 is powered on, and when the device 10 has a low battery charge. By example, an LED 18 is continuously lit when the device 10 is ON, and the LED 18 blinks on and off when there is a low battery charge. Enter the UI 12 options and push the start/pause button 26. Each selection button has an on/off indicator. In at least one embodiment, an LED is illuminated on the button when it is selected. The metronome 10 will begin playing the desired audible tones and display the appropriate visual prompts. If no resuscitation criteria are modified, or alternatively selected, the metronome operates based upon a preprogrammed default resuscitation criteria. The default settings can be based upon the most likely scenario, such as an adult having CPR performed by a single rescuer using a ventilation mask. The device 10 can begin generating resuscitation prompts based on the default criteria within a range of about 1 second to about 10 seconds from powering on or initiating the device 10. Alternatively, the default prompts are generated greater than about 10 seconds after powering on or initiating the device.

The patient age selection buttons 26a, 26b, 26c are for selecting the age of a patient for which resuscitation will be performed. As defined by the American Heart Association an adult is any patient at or above the onset of puberty (roughly 8 years of age). A child is defined as a patient between the age of one and the onset of puberty (roughly 8 years of age). An infant is considered to be a patient less than one year of age. Alternatively, the device 10 is configured with a specific age input (not shown), which provides a user the capability to input a patient's exact or approximate age. In yet another alternative embodiment, more than 3 age group selection options can be provided. An additional exemplary age group includes neonate, which is generally defined as infants less than about 1 month old.

The UI 12 has rescue operator number selection buttons 22a, 22b for selecting the number of rescue operators, which is typically either 1 or 2 people. Alternatively, the metronome 10 can be configured for more than 2 operators. These selections combined with the selected age of the patient enable the metronome 10 to determine the appropriate rates and ratios to output for a CPR sequence.

The metronome 10 outputs a resuscitation sequence that includes the appropriate chest compression rate, ventilatory rate and length of ventilation period, and patient evaluation timer. The timer has a default time of 2 minutes, which can be decreased or increased based upon the intended usage. Alternatively, the timer sequence length is hardwired for a preselected length of time, such as 2 minutes. When selected, the rescue breathing button 24b outputs only the appropriate ventilatory rate and length of ventilation period, or alternatively just the ventilatory rate. This option is ideal for situations where the patient has a pulse and requires rescue breathing or when an automatic chest compression device is being used. When the "Compressions Only" button 24c is selected, the device 10 outputs the appropriate chest compression rate and activates the patient evaluation timer. This option is appropriate for situations where the patient is being ventilated by a mechanical ventilator or when cardiocerebral resuscitation (CCR) is being preformed.

The user can select several criteria 26a, 26b regarding ventilation, such as whether the patient is ventilated via pocket mask, bag valve mask or through an advanced airway mechanism. The device 10 is initiated by pushing the start/pause button 30. The metronome 10 will then activate and begin playing the desired audible tones/prompts and display the appropriate visual prompts. At any time the pause button 30 can be pressed to temporarily stop the device 10. In at least one exemplary embodiment, pressing the pause button 30 will stop the device 10 for a preselected period of time, if it is not turned on within that period of time, then the device 10 resets the resuscitation sequence. By example, the preselected time period can be between about 1 second and about 15 seconds, or alternatively the time period can be greater than about 15 seconds.

The user at anytime has the option of adjusting the device 10 volume. The metronome 10 has an adjustable volume control that accommodates environments ranging from the patient compartment of an ambulance (loud) to a classroom (quiet). The provider also has the ability to completely silence all audible prompts and rely on the visual prompts for guidance. Silent mode is selected simply by pressing the volume down button until the device is silent.

A keypad lockout feature is provided. The keypad lockout feature prevents accidental modifications to the provider's selections by requiring a simple double tap of an option button to change a selection after the resuscitation sequence has been initiated. When the device is not activated rescuers are free to change any option with a single tap. Alternatively, a separate locking button (not shown) can initiate and disengage a UI lockout.

When the unit is powered on it immediately loads the default settings reducing the time necessary to active the metronome. The factory configured default settings can be pre-selected based upon the most likely scenario for the particular environment where the device is used. By example, the default can be set for the resuscitation of an adult patient with one rescuer performing CPR via mask ventilation. The default setting can be reprogrammable by a user. Alternatively, the default setting is a CPR scenario with the greatest statistical likelihood.

Users have the option of modifying the metronome default settings customize the device for their specific needs. For example, if a health provider works in a pediatric unit the default settings can be modified so that when the device is powered on it automatically loads the desired options for the resuscitation of an infant patient. This preference would then remain the default setting until reprogrammed by a user.

The metronome is equipped with any audible and visual low battery indicator 18 that will notify the user when only several hours of battery life remain. This feature is designed to avoid interference with patient resuscitation while the device is active. Alternatively, the device can also periodically provide an audible tone to notify the user of low battery status when the device is not in use. This feature is designed to alert the user of the low battery status when there is only one usage remaining before the batteries are depleted. The device 10 is equipped with a power source (not shown), which can be one or more electrochemical batteries, a rechargeable battery, or alternative suitable power means.

The device 10 implements a number of battery saving features. The device 10 is designed with LEDs that use very little power allowing the unit to run for extended periods of time without changing batteries. The power button must be pressed and held for one second to prevent the unit from accidentally being powered on. The metronome 10 will also automatically power off if it is not used for five minutes, and alternatively the power off time period can be altered by a user. All user settings will be saved for a preselected period of time before the unit reverts to its default settings. By example, this time period can be from about 1 minute to about 30 minutes, less than about 1 minute or greater than about 30 minutes. In a preferred embodiment, the default settings are saved for about 5 minutes after the device 10 is powered off.

The device 10 is designed to be fluid resistant and can be easily cleaned/decontaminated so that it can safely be used during the resuscitation of multiple patients. To clean the device, wipe it with a damp cloth using commercial disinfectant taking care not to get the unit excessively wet.

Figure 2:
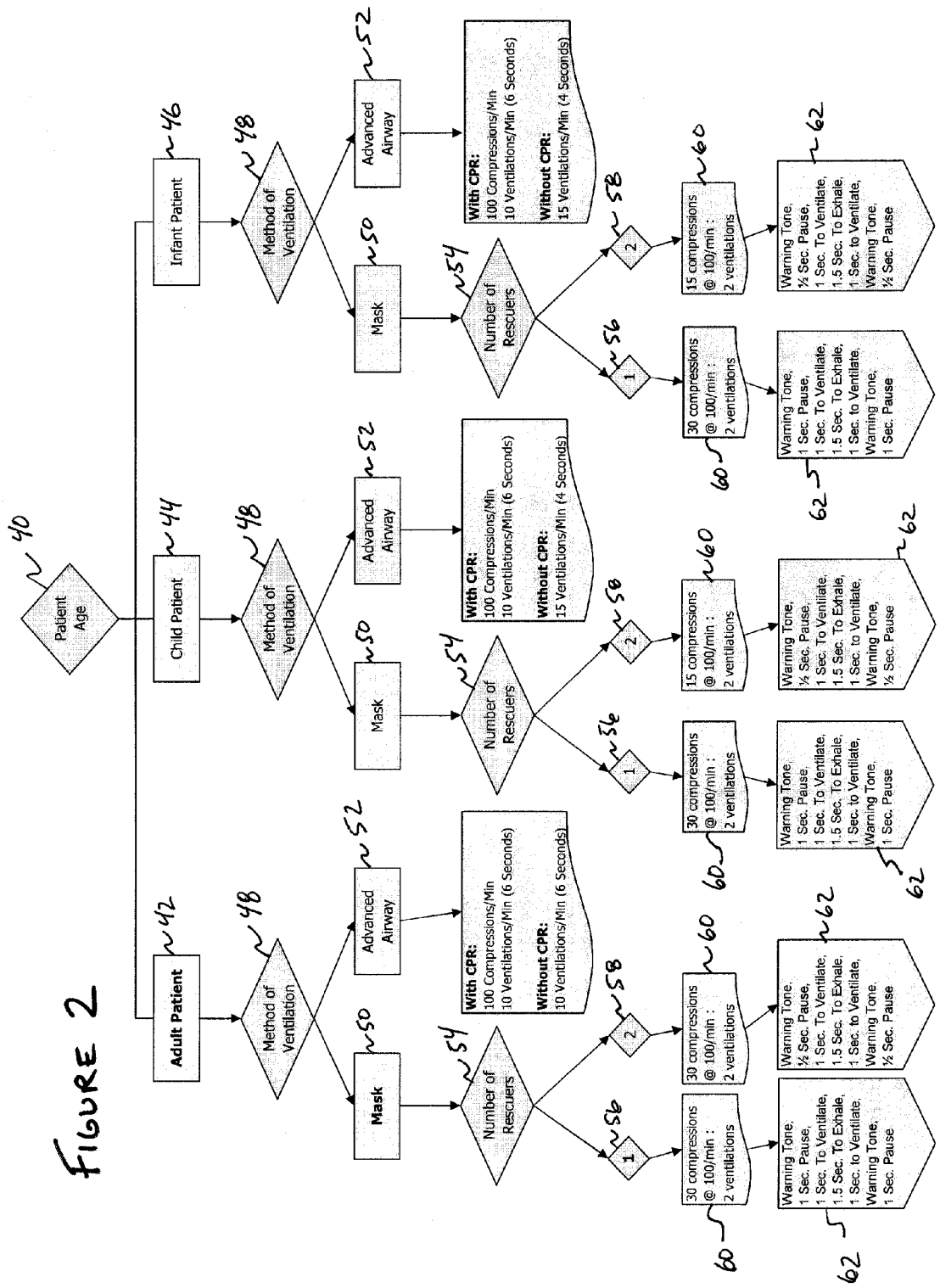
FIG. 2 is a flow chart representing a process for executing instructions associated with using the apparatus of FIG. 1 in accordance with at least one embodiment of the present invention.

Referring to FIG. 2, a flow chart is provided with an exemplary selection criteria decision method which, when selected, is used to determine a resuscitation sequence. After the device is initiated, user selects the patient's age at step 40. The user can select for an adult at step 42, a child at step 44 or infant at step 46. Alternatively, less than 3 or greater than 3 options can be present, which can affect the resuscitation sequence. The age input determines the rate of chest compressions, ventilations, and compression to ventilation ratio. An infant is defined by the AHA as a patient to one year of age, a child between one year of age and the onset of puberty, and an adult is defined as any patient above the age of puberty. The following are compression to ventilation examples:

Adult Patient: (Default)
100 chest compression per minute
10 ventilations per minute (AHA: 10-12 ventilations per minute)
Child Patient:
100 chest compressions per minute
12 ventilations per minute (AHA: 12-20 ventilations per minute)
Infant Patient:
100 chest compressions per minute
12 ventilations per minute (AHA: 12-20 ventilations per minute)

The method of ventilation is selected at step 48, which is either mask ventilation at step 50 or advanced airway mechanism at step 52. The rates for chest compressions and/or ventilations are based at least in part upon steps 50 and 52. As an example, selecting step 52 instead of step 50 in combination with selecting step 44, will reduce the ventilatory rate for children from about every 4 seconds to about every 6 seconds. This setting is designed for professional rescuers who have the ability to place a breathing tube and can then continuously compress the chest and ventilate the patient without pausing.

Mask Ventilation 50: (Default)
While in CPR mode 66 this selection will observe the proper chest compression to ventilation ratios as determined by the patient's age and the number of rescuers caring for the patient. When the proper number of chest compressions have been delivered the device will pause the chest compression tone, wait one second, and this will activate the first ventilation tone for one second, wait one and a half seconds, and then activate the second ventilation tone. Then the chest compression tones will continue.

Advanced Airway Mechanism 52:
While in CPR mode 66 this setting will disregard the chest compression to ventilation ratio and continuously provide the chest compression tones and the ventilation tones at the proper rate determined by the patient's age.

The user selects the number of rescuers at step 54. The present embodiment allows for either one or two health rescuer users through by selecting one of the buttons 22a, 22b. Alternatively, the metronome 10 can include an option for greater than 2 rescuers. This setting references the patient's age and determines the proper compression to ventilation ratio. A single rescuer is selected at step 56 and two rescuers are selected at step 58. The default selection includes a single rescuer.

The compression to ventilation ratio is determined at step 60. The following are exemplary ratios for an adult, child, and infant patient. Based upon these ratios, other selection criteria and resuscitation guidelines, resuscitation sequences are generated at step 62.

Adult Patient:
One Rescuer: 30 chest compressions: 2 ventilations (Default)
Two Rescuers: 30 chest compressions: 2 ventilations
Child Patient:
One Rescuer: 30 chest compressions: 2 ventilations
Two Rescuers: 15 chest compressions: 2 ventilations
Infant Patient:
One Rescuer: 30 chest compressions: 2 ventilations
Two Rescuers: 15 chest compressions: 2 ventilations The rescuer can select which alert tones are broadcast through the speaker 36 as well as the visual alerts/prompts displayed by the UI 12. Alternatively, the speaker 36 can broadcast pre-recorded voice commands as prompts instead of audible tones. Audible prompts, or alert tones, are generated for the following exemplary selections:

Compressions and Ventilations: (Default)
Alert tones and/or visual prompts for compressions, ventilations and two-minute assessment warning.
Rescue Breathing Only:
Alert tones and/or visual prompts for ventilations only.
Compressions Online;
Alert tones and/or visual prompts for compressions and two-minute assessment warning.

Figure 3:
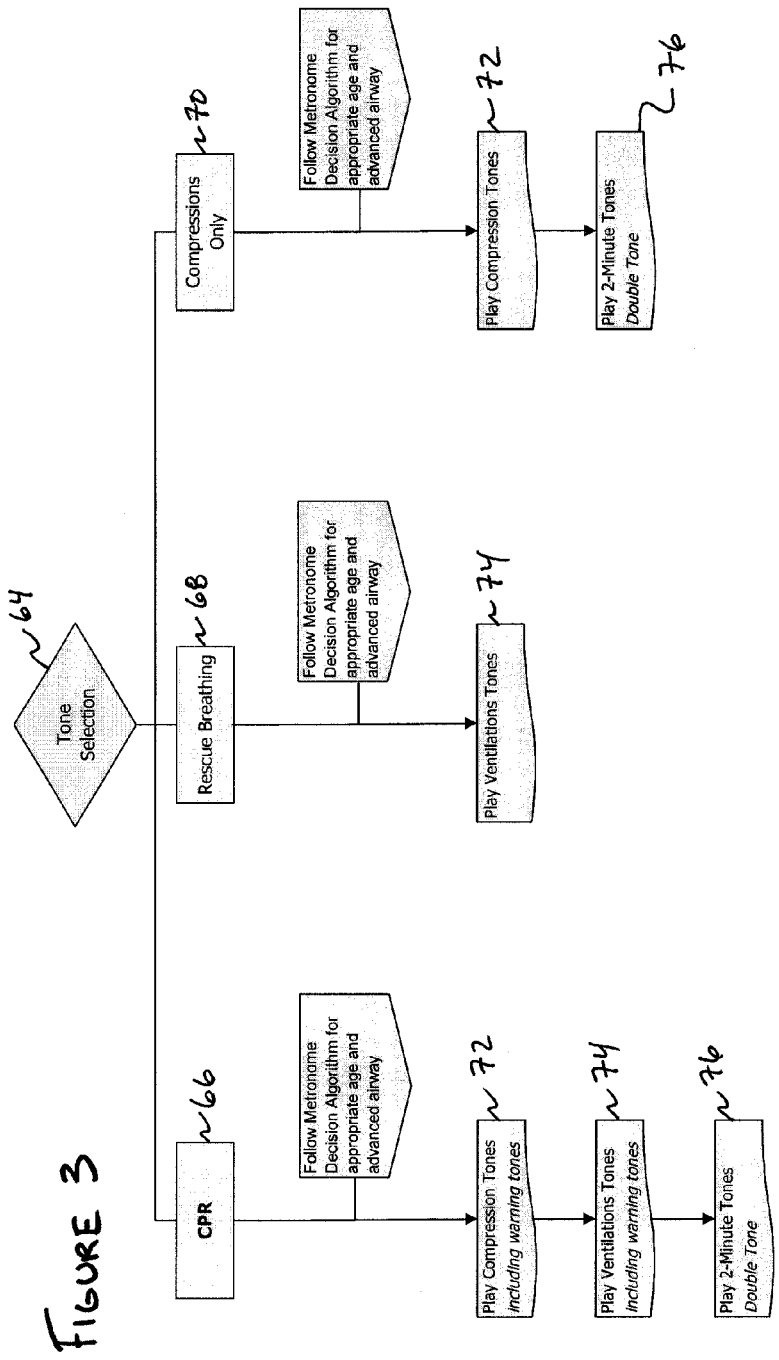
FIG. 3 is a flow chart representing an alert tone settings process in accordance with at least one embodiment of the present invention.

Referring to FIG. 3, the rescuer has the option of selecting which alert tones are heard at step 64. At this step 64 the user effectively selects the resuscitation method. CPR is selected at step 66 by pressing method button 24a. Rescue breathing step 68 is selected by pressing the method button 24b, and compression only step 70 is selected by pressing button 24c. If step 66 is selected, a resuscitation sequence including compression prompts (alerts) 72, ventilation prompts 74, and patient assessment prompts 76 are generated. If step 68 is selected, then only ventilation prompts 74 are generated. If step 70 is selected, then compression prompts (alerts) 72 and patient assessment prompts 76 are generated.

In at least one embodiment, the metronome decision algorithm is based upon patient age. Generally, the values of the rates and ratios of compressions to ventilations change based upon age. User selection of patient age determines which treatment branch to follow (determines aged based rates and ratios). As defined by the American Heart Association an adult is any patient at or above the onset of puberty (roughly 8 years of age). A child is defined as a patient between the age of one and the onset of puberty (roughly 8 years of age). An infant is considered to be a patient less than one year of age.

User can input their method of ventilation, either by mask or by some form of an advanced airway. This determines whether compressions and ventilations delivered in sets (i.e. 30 compressions followed by 2 ventilations, or 15 compressions then 2 ventilations) or if they are performed independently of each other at the designated time interval. If the user indicates the method of ventilation as being via mask then the appropriate algorithm will be followed. This allows compressions and ventilations to be synchronized with each other based on the defined ratios.

The user can input the number of rescuers present in the resuscitation. This selection combines with the selected age of the patient determine the proper ventilation to compression ratio to be performed. By example, after the designated number of chest compressions are performed, the metronome 10 alerts the user of an upcoming ventilation, pauses, plays the ventilation tone, pauses, plays the ventilation tone, and alerts the user to return to compressions. From the user's input regarding the number of rescuers, the proper rates and ratios for compression and ventilations are determined. After the designated number of chest compressions are performed, the metronome 10 alerts the user of an upcoming ventilation, pauses, plays the ventilation tone, pauses, plays the ventilation tone, and alerts the user to return to compressions as defined by item 10. Items 10 and 11 are then continuously repeated. If the user selects the method of ventilation as being via advanced airway compressions and ventilations are not synchronized and the appropriate sequence is generated.

The device 10, in accordance with at least one embodiment alternatively can be referred to as a resuscitation metronome or a CPR timer, can provide both visual and audible alerts to prompt the rescuers to provide the proper rate of chest compressions and/or ventilations to the patient. The device 10 includes the proper rates for adult, child, and infant patients as well as the appropriate chest compression to ventilatory ratio based on the patients' age and the number of rescuers involved. In at least one embodiment, the goal of the device 10 is to guide both professional and lay rescuers in providing high quality CPR and ventilations as promoted by the American Heart Association with the goal of improving the outcome of patient's that require aggressive resuscitation.

At least one embodiment of the present invention includes a three tone audio and visual pocket sized metronome designed to assist professional rescuers in providing high quality CPR. This product will provide three distinctly different tones and visual prompts to the rescuer to compress the patient's chest, ventilate the patient, and reassess the patient's condition every two minutes as described by the American Heart Association Guidelines. Alternatively, the length of the ventilation tone can indicate the length of time ventilation should be administered. This metronome will also allow the rescuer to enter the type of patient that is being resuscitated along with other pertinent information and output the proper resuscitation rates and ratios for that specific patient.

Figure 4:
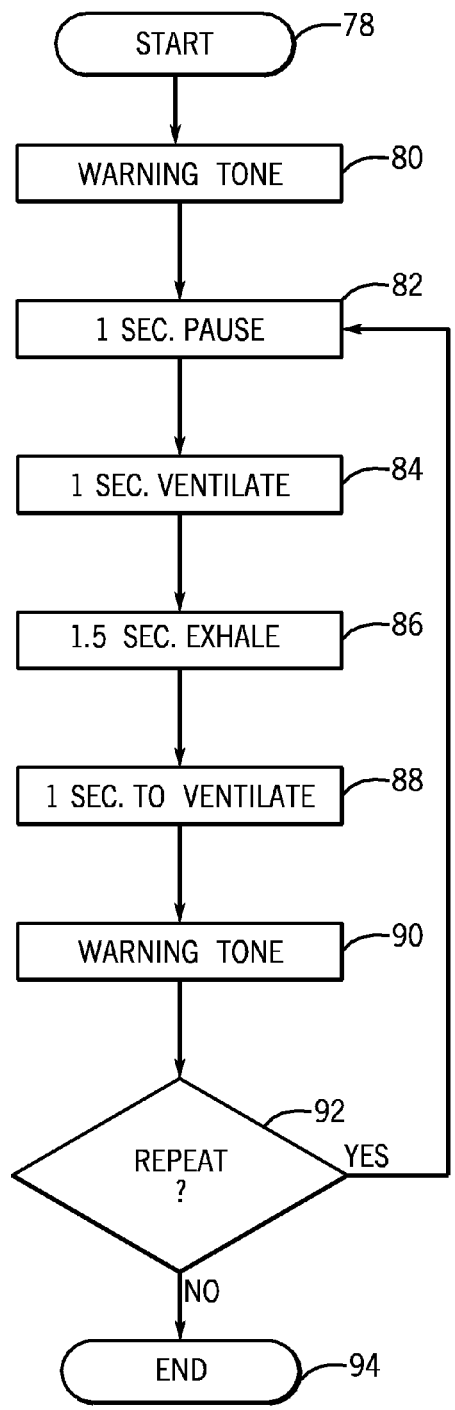
FIG. 4. is a flow chart representing an exemplary resuscitation sequence in accordance with at least one embodiment of the present invention.

Referring to FIG. 4, an exemplary resuscitation sequence is generated and initiated at step 78 with an adult patient having CPR performed by one rescuer with a mask. The sequence begins with about 30 chest compressions at a rate of about 100 compressions per minute. A warning tone is generated at step 80, indicating that the rescuer will move to ventilations, followed by a 1.0 second pause at step 82. A 1.0 second ventilation period occurs at step 84, which is followed by a 1.5 second exhaling period at step 86. A 1.0 second ventilation period occurs at step 88 and followed by a warning tone at step 90 indicating that the rescuer will return to chest compressions. A decision whether to repeat occurs at step 92. The device 10 default setting is to repeat chest compressions at this point. If the sequence is repeated, then step 82 is repeated. Alternatively, the sequence ends at step 94.

Figure 5:
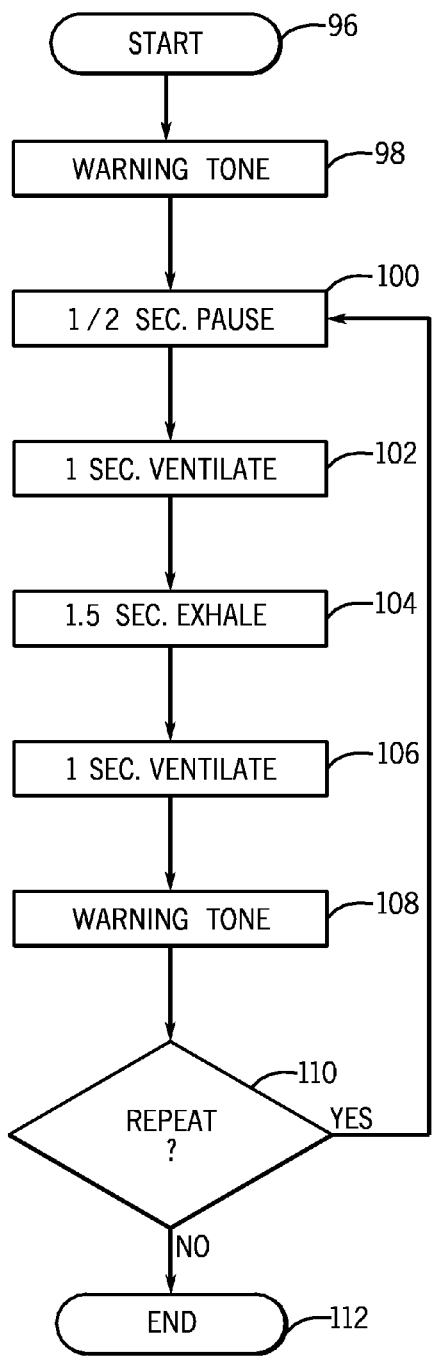
FIG. 5. is a flow chart representing an alternative exemplary resuscitation sequence in accordance with at least one embodiment of the present invention.

Referring to FIG. 5, an exemplary resuscitation sequence is generated and initiated at step 96 with an adult patient having CPR performed by two rescuers with a mask. The sequence begins with about 30 chest compressions at a rate of about 100 compressions per minute. A warning tone is generated at step 98 indicating that a rescuer should move to ventilations, followed by a ½ second pause at step 100. A 1.0 second ventilation period occurs at step 102, which is followed by a 1.5 second exhaling period at step 104. A 1.0 second ventilation period occurs at step 106 and followed by a warning tone at step 108 indicating that a rescuer will return to chest compressions. A decision whether to repeat occurs at step 110. The device 10 default setting is to repeat chest compressions at this point. If the sequence is repeated, then step 100 is repeated. Alternatively, the sequence ends at step 112.

Figure 6:
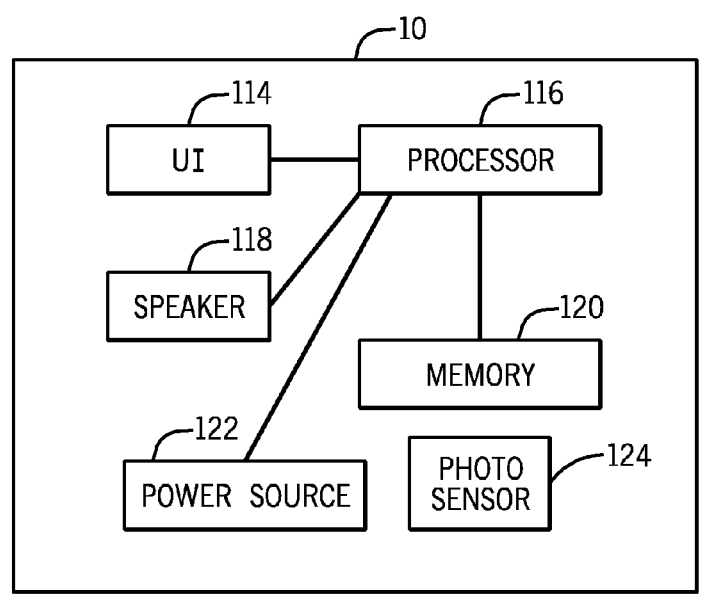
FIG. 6 is a block diagram representing an alternative and exemplary metronome.

Referring to FIG. 6, an alternative embodiment of the device 10 is provided. The device 10 includes a UI 114, a processor 116, a speaker 118, a memory storage 120, a power source 122, and a photo sensor 124. The memory 120 stores instructions that when executed by the processor 116, based at least in part upon selection criteria input through the UI 114, thereby generates a resuscitation sequence. The sequence generates various UI 114 visual prompts and/or audible prompts broadcast through the speaker 118. The photo sensor 124 automatically disables a backlit UI 114 to conserve battery life when the device 10 is used in well-lit environments. The processor 116 can be a RAM-based, EEPROM-based or alternatively known hardware suitable for processing criteria inputs and generating resuscitation sequences.

In an alternative embodiment, the device 10 is reprogrammable through an computing interface (not shown). The interface can be a USB, preferably 2.0 or greater, port accessible through a PC or alternative computing device. Alternatively, the device can be reprogrammed through an external memory device, such as a memory stick, SD or micro-SD card. In yet another alternative embodiment, the device 10 is a handheld computing device, such as a blackberry, smartphone, iPhone, portable PC, or alternative suitable computing device. In such an embodiment, the handheld computing device user interface, memory storage, processor and speaker are utilized. Resuscitation sequences are generated and provided for the handheld computing device similarly to that of the device 10. In an alternative embodiment, an electronic file containing computer executable instructions can be transferred to a computing device, such as a handheld computing device, for purposes of executing the instructions and providing medical resuscitation as discussed herein.

It is specifically intended that the present invention not be limited to the embodiments and illustrations contained herein, but include modified forms of those embodiments including portions of the embodiments and combinations of elements of different embodiments as come within the scope of the following claims.

We claim:

1. An apparatus for providing cardiopulmonary or cardiocerebral resuscitation prompts, comprising:
   a portable housing;
   a user interface having one or more resuscitation criteria selectors for inputting resuscitation criteria, the resuscitation criteria including ventilation method selection and optionally further including one or more of the following: patient age selection, user number selection, and resuscitation method selection;
   a processor configured to execute a set of instructions that generate cardiopulmonary or cardiocerebral resuscitation prompts, the instructions based at least in part upon the resuscitation criteria input from the one or more resuscitation criteria selectors; and
   a memory including the instructions for selectively performing the cardiopulmonary resuscitation prompts and cardiocerebral resuscitation prompts;
   wherein the apparatus is configured to output at least some of the generated prompts as visual prompts, audible prompts, or visual and audible prompts, and further wherein the generated prompts are output in at least one associated resuscitation sequence, the at least one associated resuscitation sequence further generated over an associated sequence length of time.

2. The apparatus of claim 1, wherein the user interface provides audio prompts, visual prompts or audio and visual prompts.

3. The apparatus of claim 1, wherein prompts begin within a range of about 1 second to about 10 seconds from initiating the apparatus, default settings for the resuscitation criteria selectors being dynamically applied.

4. The apparatus of claim 2, wherein a distinct prompt is provided for chest compressions, ventilation and elapsed time for patient assessment.

5. The apparatus of claim 3, wherein a default setting is based at least in part upon a patient with the highest statistical need for cardiopulmonary resuscitation.

6. The apparatus of claim 3, wherein the default resuscitation criteria selector settings are reprogrammable.

7. The apparatus of claim 6, wherein the default setting is configured for pediatric use.

8. The apparatus of claim 1, wherein the resuscitation criteria include each of the following: patient age selection, user number selection, and resuscitation method selection.

9. The apparatus of claim 6, wherein the housing is spill resistant.

10. A method for providing resuscitation prompts comprising:
   providing a timing apparatus configured to selectively generate cardiopulmonary resuscitation and cardiocerebral resuscitation prompts, the prompts based at least in part upon resuscitation criteria selection;
   selecting resuscitation criteria, the resuscitation criteria including ventilation method selection and optionally further including one or more of the following: patient age selection, user number selection, and resuscitation method selection;
   selectively generating one or more of:
      (a) audio, visual or audio and visual ventilation prompts;
      (b) audio, visual or audio and visual compression prompts; and
      (c) audio, visual or audio and visual patient assessment prompts; and
   outputting at least some of the selectively generated prompts in a resuscitation sequence associated with the prompts and over an associated sequence length of time.

11. The method according to claim 10, wherein cardiopulmonary resuscitation is performed upon an adult patient.

12. The method according to claim 10, wherein the resuscitation criteria includes resuscitation method selection and the resuscitation method selection comprises cardiopulminary resuscitation method selection, rescue breath resuscitation method selection or compressions only resuscitation method selection and wherein:
   (i) when the resuscitation method selection comprises the cardiopulminary resuscitation method selection, the selection of patient age selection, user number selection, and ventilation method selection may be used to determine at least one of: (a) an appropriate rate of chest compressions, (b) an appropriate ratio of chest compressions to ventilations; (c) an appropriate ventilatory rate; and (d) an appropriate elapsed time for patient assessment;
   (ii) when the resuscitation method selection comprises the rescue breathing resuscitation method selection, the selection of patient age selection, user number selection, and ventilation method selection may be used to determine at least one of: (a) an appropriate ventilatory rate, and (b) an appropriate elapsed time for patient assessment; or
   (iii) when the resuscitation method selection comprises the compressions only resuscitation method selection, the selection of patient age selection, user number selection, and ventilation method selection may be used to determine at least one of: (a) an appropriate rate of chest compressions, and (b) an appropriate elapsed time for patient assessment.

13. The method according to claim 10, wherein the resuscitation prompts are based at least in part upon the American Heart Association Guidelines for cardiopulmonary and/or cardiocerebral resuscitation and wherein the audio, visual or audio and visual patient assessment prompts are generated repeatedly after a preselected period of time.

14. The method according to claim 13, wherein the apparatus is reprogrammable upon change in the Guidelines or based on another desired user customization.

15. The method according to claim 10, wherein the selectively generated cardiopulmonary resuscitation and cardiocerebral resuscitation prompts are each associated with a resuscitation sequence that is selected from the group consisting of the following resuscitation sequences: cardiopulmonary resuscitation, rescue breathing, chest compressions and cardiocerebral resuscitation.

16. The apparatus of claim 1, wherein the selectively generated cardiopulmonary resuscitation and cardiocerebral resuscitation prompts are each associated with a resuscitation sequence.

17. The apparatus according to claim 1, further comprising a user interface lockout means.

18. The apparatus according to claim 1, wherein the apparatus is a handheld computing device and the set of instructions are stored in the memory, and wherein the memory is an electronic memory file transferred to the handheld computing device.

19. The apparatus according to claim 1 being preprogrammed with default criteria settings that are automatically loaded, wherein the default criteria settings can be reprogrammed, so as to be modified, by a user, thereby permitting customization of the apparatus.

20. The apparatus of claim 1, wherein the cardiopulmonary resuscitation prompts comprise prompts for performing chest compressions only and at an appropriate chest compression rate when a patient is being ventilated by a mechanical ventilator, or wherein the cardiocerebral resuscitation prompts comprises prompts for performing chest compressions only and at an appropriate chest compression rate.

* * * * *